Sept. 17, 1940.          E. J. HARDY ET AL          2,215,120
                     TIRE DEFLATION INDICATOR
                     Filed June 15, 1938          2 Sheets-Sheet 2
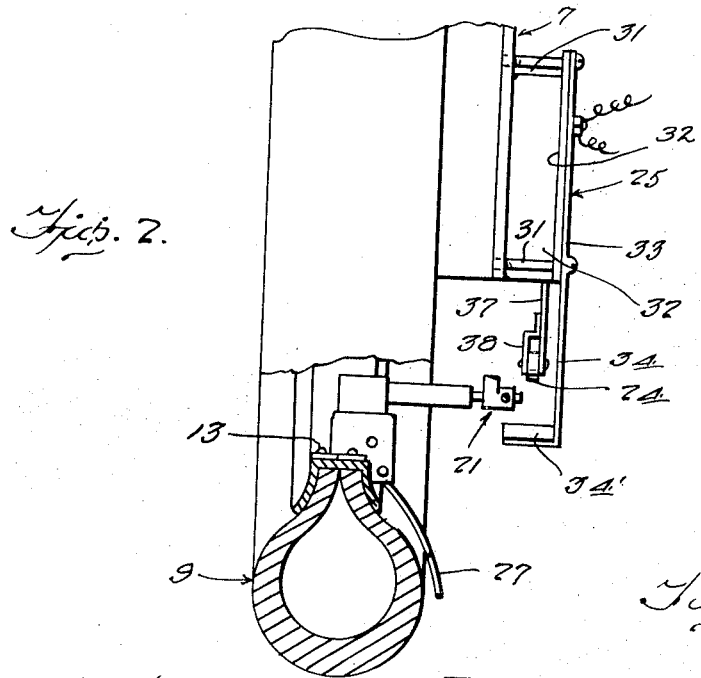
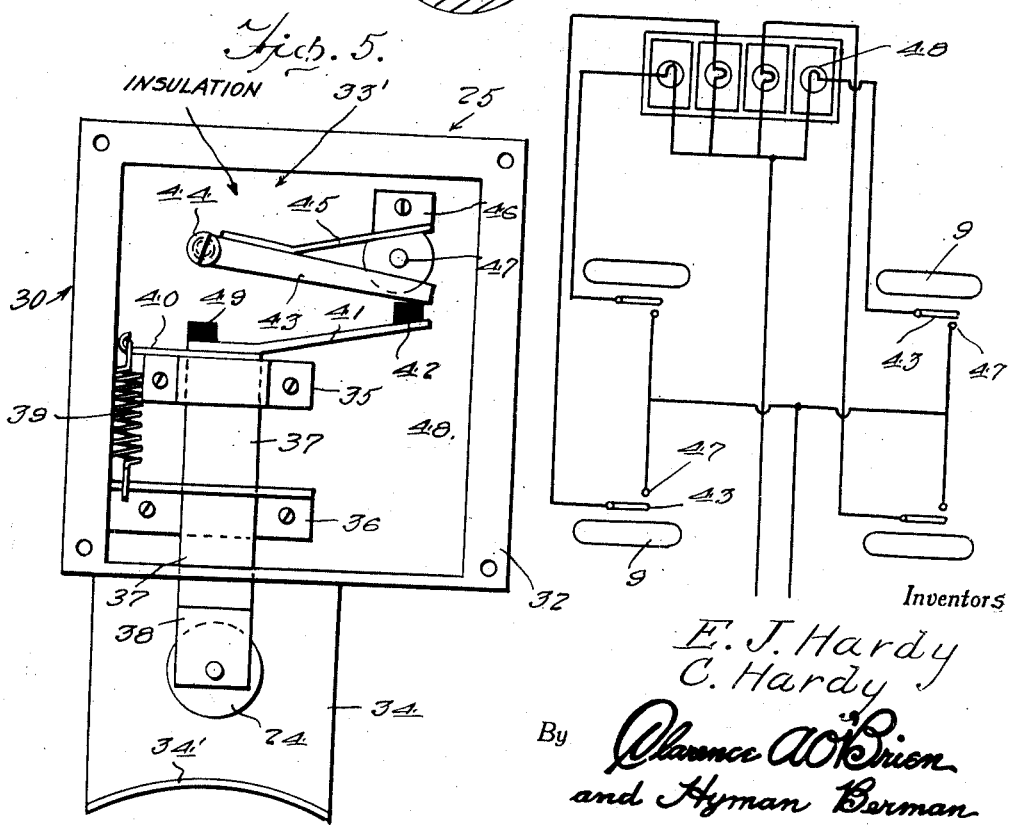
Inventors
E. J. Hardy
C. Hardy
By Clarence A. O'Brien
and Hyman Berman
Attorneys Patented Sept. 17, 1940

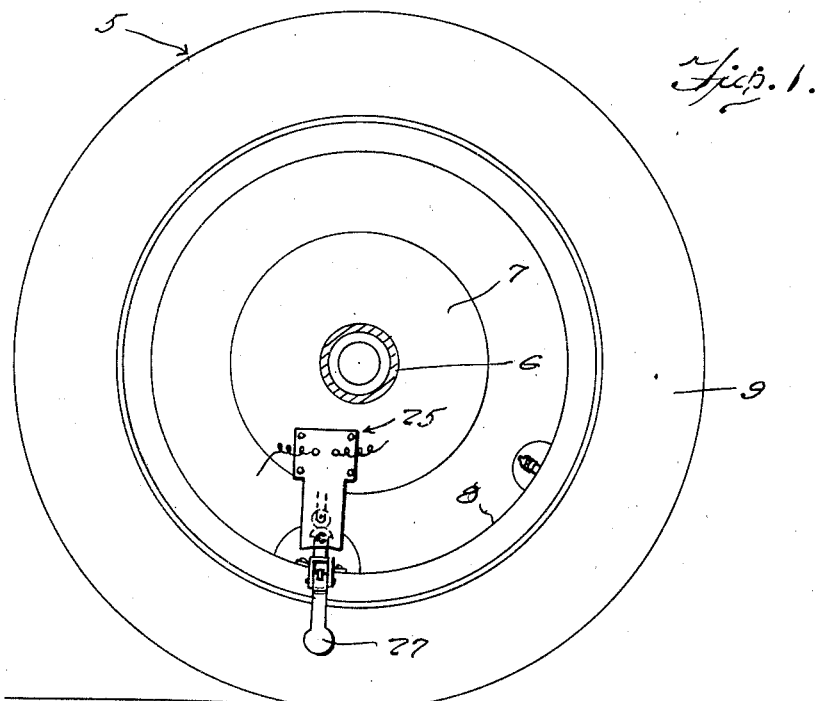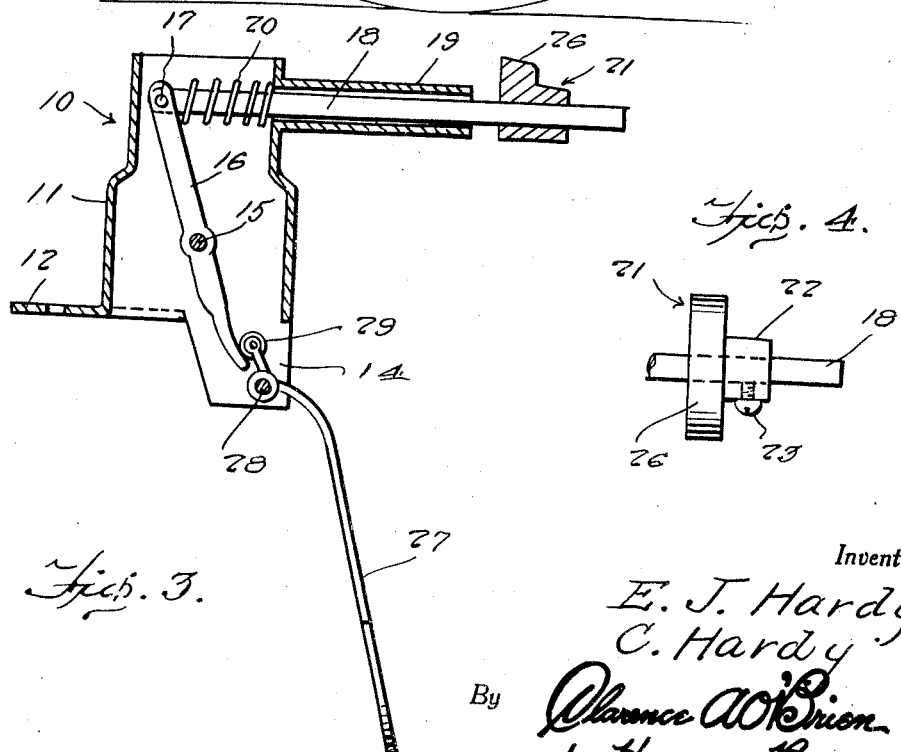

2,215,120

UNITED STATES PATENT OFFICE 2,215,120

TIRE DEFLATION INDICATOR

Edgar J. Hardy and Clyde Hardy, Cordell, Okla., assignors of ten per cent to Arthur L. Robinson, and fifty per cent to Lowell R. Smith and Payte Baldwin, Cordell, Okla.

Application June 15, 1938, Serial No. 213,909

4 Claims. (Cl. 200—58)

Our invention relates generally to means for automatically indicating to the driver of an automobile or the like, an underinflated condition of one or more of the pneumatic tires of the automobile, and particularly to an electro-mechanical arrangement of the character indicated which is inoperative while the tires are in a properly inflated condition, and an important object of our invention is to provide a simple and efficient arrangement of the character indicated and which can be readily attached by a practical mechanic on automobiles of all types.

Other important objects and advantages of the present invention will be apparent from a reading of the following description taken in connection with the drawings, wherein for purposes of illustration we have shown a preferred embodiment of our invention.

In the drawings:

Figure 1 is a sectional view showing the inboard side of a pneumatic tire equipped wheel and a stationary brake housing related thereto, portions of the device being mounted respectively on the brake drum housing and on the wheel in cooperative relation.

Figure 2 is a transverse vertical sectional view taken through Figure 1 and looking from left to right.

Figure 3 is an enlarged transverse vertical sectional view taken through the tire operated element of the device.

Figure 4 is an elevational view of the longitudinally adjustable cam.

Figure 5 is an elevational view of the inner side of the switch element of the device.

Figure 6 is a schematic wiring diagram of the device in connection with indicating lamps.

Referring in detail to the drawings, the numeral 5 generally designates a pneumatic tire equipped wheel and adjacent structure including the axle housing 6 on which is stationarily mounted the brake drum housing 7, the wheel consisting of the rim portion 8, carrying the pneumatic tire 9. In accordance with the present invention, a tire operated unit which is generally designated 10 consists of a housing 11 which is generally rectangular in cross section and vertically elongated and provided on its outboard lower end with a lateral flange 12 which is bolted or riveted as indicated by the numeral 13 to the radially inward side of the wheel rim 8, the bottom of the housing 11 having depending flanges 14 shaped to rest their edges against the inboard side of the wheel rim 8 as shown in Figures 2 and 3 of the drawings. An axle 15 traverses the housing 11 and acts as a pivotal support for the substantially vertical lever 16 which has its upper end pivoted as indicated by the numeral 17 to one end of a plunger rod 18 which is mounted in a tube 19 extending in an inboard direction from the upper part of the housing 11. A helical spring 20 is circumposed on the rod 18 between the housing and the lever 16 as clearly shown in Figure 3 for normally retracting the rod 18. The rod 18 carries at its outer end a longitudinally adjustable cam which is generally designated 21 and which has a collar portion 22 provided with a set screw 23 for locking the cam in a longitudinally adjusted position on the rod 18 for properly engaging the roller 25 of the switch element which is generally designated 25. The lobe 26 of the cam 21 is upwardly positioned for camming action on the roller 24 when the rod 18 has been pushed in an inboard direction by reason of lateral expansion of the tire 9 due to an underinflated condition, with the expanded side of the tire engaging and moving the arm 27 which is pivoted on the axle 28 extending between the housing flanges 14 and has a small roller 29 engaged with one side of the lower arm of the lever 16 as clearly shown in Figure 3 of the drawings. The arm 27 is normally sufficiently spaced from the side of the tire 9 to permit normal flexing of the tire without operation of the described mechanism, while the tire is in a properly inflated condition.

The switch element 25 comprises a generally rectangular housing 30 which fits against the inboard end of the brake drum housing 7 as illustrated in Figure 2 and is clamped in place by means of bolts 31 which pass along the outer sides thereof and thread into the brake drum housing, the said bolts passing through the corners of the flange 32 and through the plate 33 which has the depending portion 34 and projection 34', the plate 33 closing the end of the housing 30 remote from the brake drum housing 7.

A block 33' of insulating material is mounted on the inner face of the plate 33 within the housing 30 and brackets 35 and 36 are secured to said plate 33 and to said block. These brackets act to support the vertically movable arm 37 which has a clevis 38 at its lower end rotatably mounting the roller 24. A contracting spring 39 stretched between the bracket 36 and the lateral arm 40 on the upper end of the arm 37 holds the arm 37 in a depressed position in which the cam 21 can engage and elevate the roller 24 when the rod 18 has been operated to a switch element operating condition by an underinflated condition of the tire 9. On the upper end of the arm 37 is a laterally extending spring arm 41 provided at its outer end with an insulation block 42 which upon the upward movement of the arm 37 is adapted to engage the free end of the conductive arm 43 which is pivoted on a screw 44 and has on its upper side a spring 45 which has a bent end portion 46 which is connected with the block of insulating material 33', this spring 45 acting to hold the arm 43 in lowered position and against the block 42 of non-conducting material. A projecting contact 47 is arranged to be engaged by the upper edge of the free end of the arm 43 when the arm 43 is pressed upwardly by the block 42 as the arm 37 moves upwardly, thereby closing a circuit to the related one of the indicator bulbs arranged in a battery in the driving compartment of the automobile, the bulb having its opposite side connected to a suitable source of electrical current as indicated in Figure 6 of the drawings. As the cam leaves the roller 24, the arm 37 is pulled downwardly to its original depressed position by the spring 29 and also by the action of the spring 45 which separates the arm 43 from the contact 47, and thereby deenergizes the bulb corresponding to the particular wheel. The conductors are connected with the terminal screw 44 and with the contact 47 so that when the arm 43 engages the contact 47 the circuit is closed. These parts are normally insulated from each other by the block 33' of non-conducting material. It is to be noted that an insulation block 49 is arranged on the secured end of the arm 41 so as to prevent engagement of the arm 41 with the bolt 44 of the arm 43 in an elevated position of the arm 47.

Although we have shown and described herein a preferred embodiment of our invention, it is to be definitely understood that we do not desire to limit the application of the invention thereto, and any change or changes may be made in the materials and in the structure and arrangement of the parts, within the spirit of the invention and the scope of the subjoined claims.

Having described the invention, what is claimed as new is:

1. In a tire deflation indicator, a housing adapted to be connected to the rim of a wheel, an arm having a part pivoted in the housing and a part extending alongside of the tire for engagement by the tire when the same expands laterally when under inflation, a lever pivoted intermediate its ends in the housing and having one end engaged by an end of the arm, a tubular guide member extending at right angles to the housing and arranged substantially parallel to the axis of the tire, a rod slidably passing through said tubular member and having one end connected with an inner end of the lever, a cam on the other end of the rod, spring means on that part of the rod within the housing and having one end bearing against the lever and the other end against a wall part of the housing, said spring holding the cam carrying rod in an inward position and biasing the tire engaging arm toward said tire, a switch and means for closing the switch when the cam carrying rod is projected by engagement of the arm by the partly deflated tire.

2. A tire deflation indicator comprising a switch casing adapted to be attached to a stationary part of a vehicle adjacent a wheel thereof, a switch arm pivoted in the casing, spring means for normally holding the switch arm in open position, guides in the casing, a vertically arranged member slidably arranged in the guides, an arm connected with the upper end of said member and having a part at its outer end of non-conducting material for engaging the switch arm for moving the same to closed position when the vertical member is raised, spring means for normally holding the vertical member in lowered position, a roller on the lower end of said arm, and means actuated by a part of a tire when the same is partly deflated for engaging the roller for raising the vertical member to close the switch.

3. A tire deflation indicator comprising a switch casing adapted to be attached to a stationary part of a vehicle adjacent a wheel thereof, a switch arm pivoted in the casing, spring means for normally holding the switch arm in open position, guides in the casing, a vertically arranged member slidably arranged in the guides, an arm connected with the upper end of said member and having a part at its outer end of non-conducting material for engaging the switch arm for moving the same to closed position when the vertical member is raised, spring means for normally holding the vertical member in lowered position, a roller on the lower end of said arm, and means actuated by a part of a tire when the same is partly deflated for engaging the roller for raising the vertical member to close the switch, and a guard member depending from the casing and having a right angularly extending part at its lower end extending under the roller.

4. A tire deflation indicator comprising a switch casing adapted to be attached to a stationary part of a vehicle adjacent a wheel thereof, a switch arm pivoted in the casing, spring means for normally holding the switch arm in open position, guides in the casing, a vertically arranged member slidably arranged in the guides, an arm connected with the upper end of said member and having a part at its outer end of non-conducting material for engaging the switch arm for moving the same to closed position when the vertical member is raised, spring means for normally holding the vertical member in lowered position, a roller on the lower end of said arm, and means actuated by a part of a tire when the same is partly deflated for engaging the roller for raising the vertical member to close the switch, said tire engaging means including a housing adapted to be connected to the rim of a wheel and having a right angular extending part of tubular form, a rod passing through said tubular part, a cam on the outer end of the rod for engaging the roller when the rod is projected to place the cam adjacent the roller, an arm pivoted in the housing and having a part extending outwardly alongside a part of the tire to be engaged by the tire when the same becomes partly deflated and means actuated by the movement of the arm for projecting the cam carrying rod.

EDGAR J. HARDY.
CLYDE HARDY.